(No Model.) 2 Sheets—Sheet 1.
A. H. LESSELLS.
VELOCIPEDE.
No. 455,220. Patented June 30, 1891.
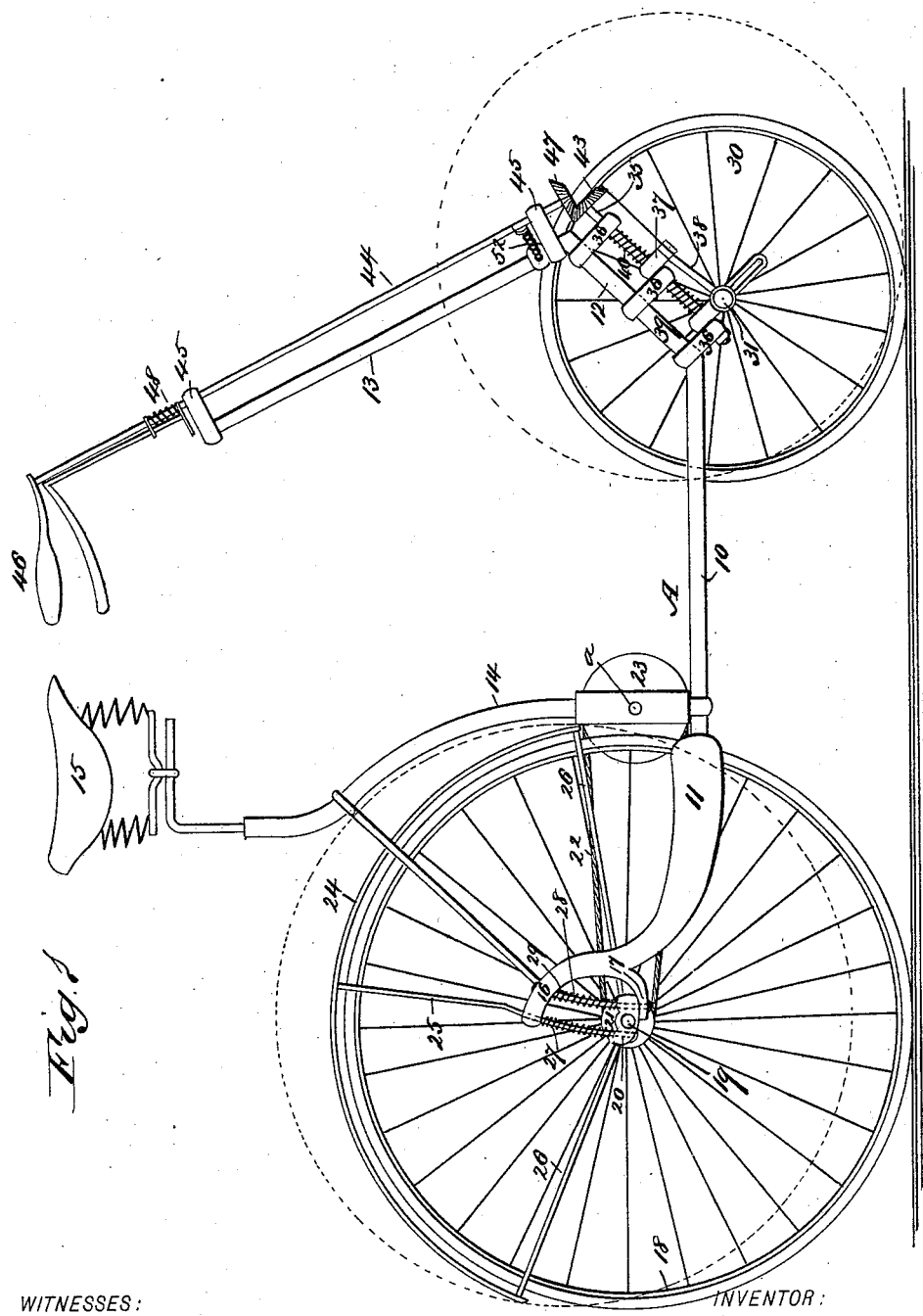
WITNESSES:
INVENTOR:
BY
ATTORNEYS (No Model.) 2 Sheets—Sheet 2.
A. H. LESSELLS.
VELOCIPEDE.
No. 455,220. Patented June 30, 1891.
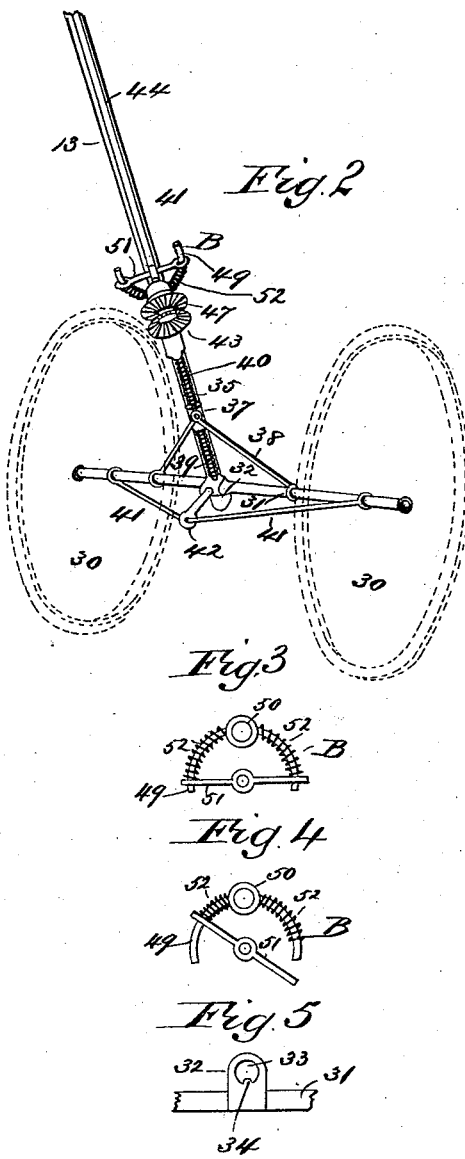
WITNESSES:
INVENTOR:
A. H. Lessells
BY Munn & Co
ATTORNEYS

UNITED STATES PATENT OFFICE.

ALLAN H. LESSELLS, OF NEW BRIGHTON, ENGLAND.

VELOCIPEDE.

SPECIFICATION forming part of Letters Patent No. 455,220, dated June 30, 1891.

Application filed November 8, 1890. Serial No. 370,768. (No model.)

*To all whom it may concern:*

Be it known that I, ALLAN H. LESSELLS, of New Brighton, Cheshire, England, have invented a new and useful Improvement in Tricycles, of which the following is a full, clear, and exact description.

My invention relates to an improvement in tricycles, and has for its object to provide a simple, durable, and effective device for steering or guiding the machine; and a further object of the invention is to provide a guard for the rear of the drive-wheel, which will maintain the same distance from the periphery of the wheel whether the said wheel be elevated by an obstruction or whether the wheel be traveling upon smooth ground.

A further object of the invention is to provide a means whereby, when two small forward wheels are employed, both of the wheels may be made to constitute steering-wheels.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of a tricycle having my improvement applied. Fig. 2 is a front elevation of the steering-wheels and the steering apparatus, illustrating the manner in which the wheels are turned from side to side; and Figs. 3, 4, and 5 are detail views of the steering mechanism.

The backbone A of the tricycle is preferably made tubular, and comprises a horizontal member 10, provided at its rear extremity with a fork 11, an upwardly and forwardly inclined member 12, integral with the horizontal member 10, and an upwardly and rearwardly extending member 13, integral with the forwardly-extending member 12. Near the junction of the member 10 with the fork 11 an upwardly-curved member 14 is secured, upon the upper end of which member the rider's seat 15 is supported. The pedal-shaft is journaled in the upwardly-curved member 14 at the point $a$, (illustrated in Fig. 1,) and each member of the fork 11 at its rear extremity is formed with two spaced horns 16 and 17, one being located directly over the other, the said horns partaking somewhat of the shape of the letter C. The rear or driving wheel 18 is mounted upon an axle 19, which axle is held to turn in bearing-blocks 20, the said blocks being supported upon the lower horns 17 of the fork 11. The axle of the driving-wheel 18 has preferably attached thereto a pulley or sprocket-wheel 21, which has a belt connection 22 with a larger pulley or sprocket wheel 23, secured to the pedal shaft or axle. Over the driving-wheel 18 a guard or fender 24 is located, which guard is directly connected with the bearing-blocks 20 by means of central arms 25 and side arms 26, the central arms being carried downward through apertures in the upper horns 16 of the fork 11. The inner ends of all of the arms 25 and 26 are rigidly secured to the bearing-blocks.

The arms 25 between the horns 16 of the fork 11 and the bearing-blocks are curved, the center of the circle being the center of the crank-shaft $a$, and around the curved portion of the arms 25 of the guard 24 springs 27 are coiled. The bearing-blocks 20, as heretofore stated, rest upon the lower horns 17 of the fork, and are held in position by bars or rods 28, curved concentrically with the curved portion of the arms 25, which rods or bars are preferably rectangular in cross-section, and are secured at their extremities to the horns 16 and 17. The rods or bars 28 pass downward through suitable apertures or openings in the bearing-blocks 20, as is best shown in Fig. 1, the said bearing-blocks being capable of movement upon the said rods. Springs 29 are coiled around the rods or bars 28, one end of the springs resting upon the bearing-blocks, while the opposite end of said springs has a bearing against the upper horns 16 of the fork, as is likewise best shown in Fig. 1. By means of this construction the guard 24 is always held at the same distance above the periphery of the driving-wheel 18, no matter whether the wheel be passing over an obstruction or traveling upon level ground, as in the event the wheel passes over an obstruction the bearing-blocks in which the axle 19 of the wheel is journaled rise upward, guided by the bars or rods 28, and in rising upward the bearing-blocks compress both of the springs 27 and 29. The bearing-blocks also in rising upward carry with them the arms 25 and 26, supporting the guard 24, and it is evident that the guard 24 will be elevated the same distance as the wheel over which it is placed. The springs 27 and 29 serve to force the bearing-blocks downward to their normal position as soon as the obstruction is passed.

In the form of tricycle illustrated two small forward steering-wheels 30 are employed, both of which wheels are mounted loosely upon an axle 31. At the center of the axle 31 a block 32 is secured, which block is provided with a circular opening 33, the inner wall of which opening has formed thereon a rib 34. A shaft 35 is made to pass through the opening 33 of the axle-block 32, which shaft is parallel with the member 12 of the backbone, as best illustrated in Fig. 1, the shaft being held to turn in hangers or brackets 36, preferably three in number, secured to and projecting downward from the said member 12 of the backbone. The shaft 35 has a longitudinal groove produced therein, in which the rib 34 of the block 32 is adapted to enter. Between the upper hanger 36 and the intermediate hanger a second block 37, of like construction to the lower block 32, is located, through the aperture of which block the shaft 35 also extends. This upper block 37 is connected with the axle by means of brace-rods 38. Between the lower block 32 and the intermediate hanger 36 a spring 39 is coiled around the shaft 35, and a second spring 40 is likewise coiled around the shaft between the intermediate and upper hanger 36. The axle is usually braced by means of rods 41, attached near the ends of the axle, which rods are secured to a forwardly-projecting bar 42, secured to the lower block 32; but, if desired, the brace-rods 41 may consist of a single piece of metal passed through an eye in the rod 42, as shown in Fig. 2. The upper end of the shaft 35 has rigidly attached thereto a miter-gear 43. Parallel with and in front of the upwardly rearwardly-extending member 13 of the backbone a steering-shaft 44 is located, the said shaft being journaled in suitable brackets or hangers 45, attached to the said member of the backbone, as shown in Fig. 1. The shaft at its upper end is provided with a handle 46, within convenient reach of the saddle or seat 15, and the lower end of the shaft 44 has rigidly secured thereto a bevel-gear 47, which meshes with the bevel-gear 43 of the lower shaft 35. Any approved form of brake 48 is connected with the shaft 44, whereby the said shaft may be locked when it is desired to mount the vehicle or dismount therefrom.

The shaft 44 is provided with a regulator B, which regulator is illustrated in detail in Figs. 3 and 4, and consists of a semicircular rod 49, provided at its center with an eye 50, whereby the said rod is fitted over the upper forward member 13 of the backbone, and when so fitted the ends of the semicircular rod 49 extend forward at each side of the shaft 44. Upon the shaft 44 a horizontal bar 51 is centrally attached, which bar is provided at its ends with eyes or openings adapted to receive the extremities of the semicircular rod or bar 49, and around the semicircular rod or bar 49, at each side of the eye, a spring 52 is coiled, whereby when the forward steering-wheels are in position to carry the vehicle straight ahead the bar 51 will be located, as is shown in Fig. 3—that is, bearing equally against each of the springs 52. When, however, the shaft 44 is manipulated to turn the steering-wheels to the right or to the left, one or the other of the springs 52 will be compressed, as shown in Fig. 4, and the moment that the shaft 44 is released by the rider the compressed spring will act to restore the shaft to its normal position, and thereby bring the steering-wheels in position to carry the vehicle straight ahead.

As shown in Fig. 2, the steering device and wheels are in the position they respectively assume when the tricycle is turning to the right, the right-hand wheel being pushed backwardly and upwardly, thus canting the tricycle over at the same angle taken by a bicycle in turning, the bar 51 of the regulator compressing the right-hand spring 52 on the bar 49.

The dotted circle in Fig. 1 illustrates the size of steering-wheel that might be substituted for that shown in full lines by transferring the axle 31 to the bearings 37 and connecting the braces 38 to the axle and the block 32.

Having thus described my invention, I claim as new and desire to secure by Letters Patent—

1. In a tricycle or similar vehicle, the combination, with a forward shaft and two steering-wheels journaled upon said shaft, of an apertured block provided with a feather attached to the axle, a shaft passing through the aperture of the block and grooved to receive the feather, and a second shaft having a gear connection with the axle-shaft, substantially as shown and described.

2. In a tricycle or similar vehicle, the combination, with two steering-wheels mounted to turn upon one axle, the said axle being provided with a block having an aperture and a feather, and a second block held above the axle-block and also provided with an aperture and a feather, of a shaft passing through the two blocks, provided with a longitudinal groove to receive the feathers thereof and having a miter-gear secured to its forward end, a steering-shaft provided with a handle at its upper end, and a miter-gear at its lower end meshing with the gear of the axle-shaft, as and for the purpose specified.

3. In a tricycle or similar vehicle, the combination, with two steering-wheels mounted to turn upon one axle, a block secured to the axle near its center, provided with an opening and a feather upon the wall of the opening, a second and upper block connected with the axle-block and constructed in like manner, a shaft passing through the blocks, having a groove produced therein to receive the feathers, and springs coiled around the shaft, of a steering-shaft provided with a handle at its upper end, a gear at its lower end meshing with the gear upon the axle-shaft, and a spring-actuated regulator connected with the steering-shaft, as and for the purpose specified.

4. In a tricycle or similar vehicle, the combination, with the backbone thereof, a fork attached to the backbone, provided with vertical and rearwardly-extending horns integral with each member, bearing-blocks located upon the lower horns, and curved bars or rods connected with the horns, one at each side, passed through apertures in the bearing-blocks and surrounded by a spring, of a drive-wheel held to revolve in the bearing-blocks, a guard or fender supported above the drive-wheel, side arms projected inward from the guard and attached to the bearing-blocks, central arms projected downward from the guard through the upper horns of the fork to a connection with the bearing-blocks, the said central arms being curved between the fork and bearing-block concentric with the curved bars, and springs surrounding the curved portion of the central arms between the bearing-blocks and the horns of the fork, as and for the purpose specified.

ALLAN H. LESSELLS.

Witnesses:
GEO. JAMES,
WM. PIERCE.